United States Patent [19]

Scobie et al.

[11] Patent Number: 4,846,441
[45] Date of Patent: Jul. 11, 1989

[54] METHODS AND APPARATUS FOR ADJUSTING A VALVE CLOSURE MEMBER

[75] Inventors: William B. Scobie, Houston; Douglas G. Calvin, Missouri City, both of Tex.

[73] Assignee: Keystone International, Inc., Houston, Tex.

[21] Appl. No.: 209,109

[22] Filed: Jun. 20, 1988

[51] Int. Cl.[4] .............................................. F16K 1/22
[52] U.S. Cl. ..................................... 251/307; 251/308
[58] Field of Search ................. 251/308, 307, 305, 306

[56] References Cited

U.S. PATENT DOCUMENTS

| | | | |
|---|---|---|---|
| 3,752,181 | 8/1973 | Mamis et al. | 251/307 X |
| 3,961,769 | 6/1976 | Crow et al. | 251/307 X |
| 3,974,855 | 8/1976 | Webb | 251/307 X |
| 4,294,428 | 10/1981 | Ohada et al. | 251/307 X |
| 4,682,758 | 7/1987 | Scobie et al. | 251/308 X |

Primary Examiner—A. Michael Chambers
Assistant Examiner—John C. Fox
Attorney, Agent, or Firm—Browning, Bushman, Zamecki & Anderson

[57] ABSTRACT

Improved techniques are provided for adjusting the axial position of a rotatable valve closure element carrying an elastomeric annular seal with respect to a metallic valve body. An adjustable nut is threaded to the valve body and includes a recess for receiving a lower stem of the valve closure member. One or more interference members are spaced radially between the nut and the lower stem, and permit axial movement of the lower stem and thus the annular seals with respect to the valve body, while enabling the valve closure member to freely rotate during normal use of the valve. According to the method of the present invention, the lower stem is positioned within the recess of the nut, interference members are then fitted therebetween, the subassembly is then connected to the valve body and the shaft end interconnected with the valve closure member, and the closure member and seal are then centered with respect to the valve body by rotating the nut, which is then locked in position with respect to the valve body when the desired axial position has been achieved.

16 Claims, 2 Drawing Sheets

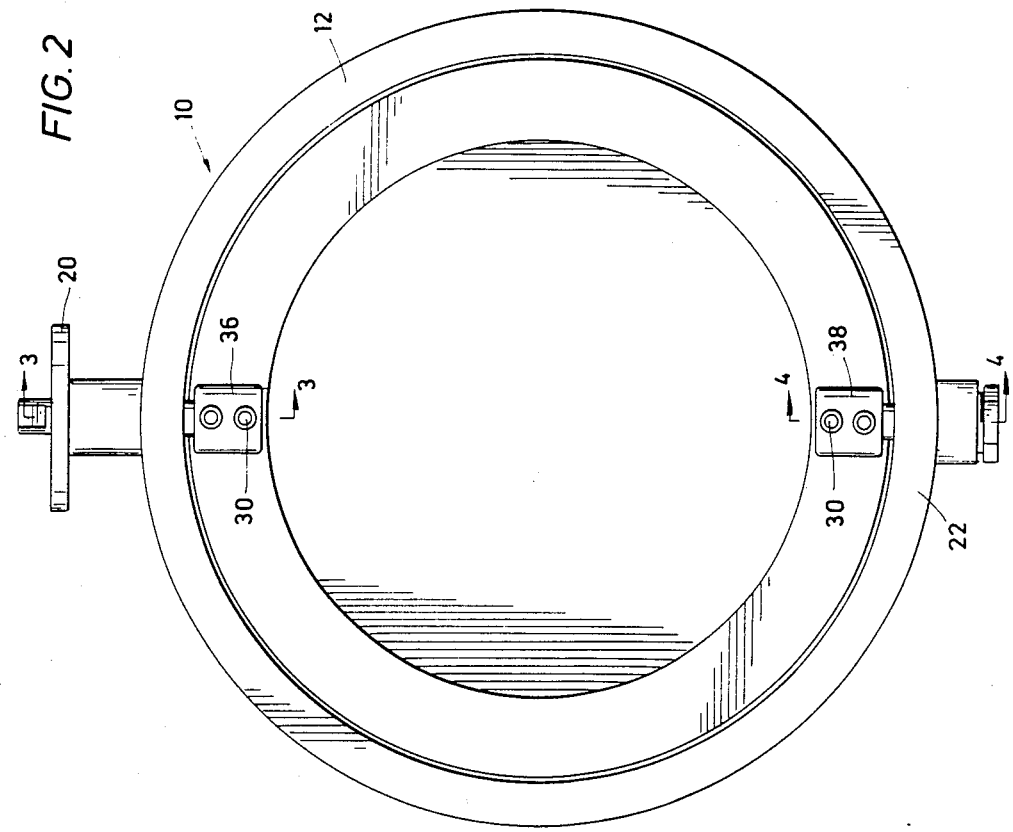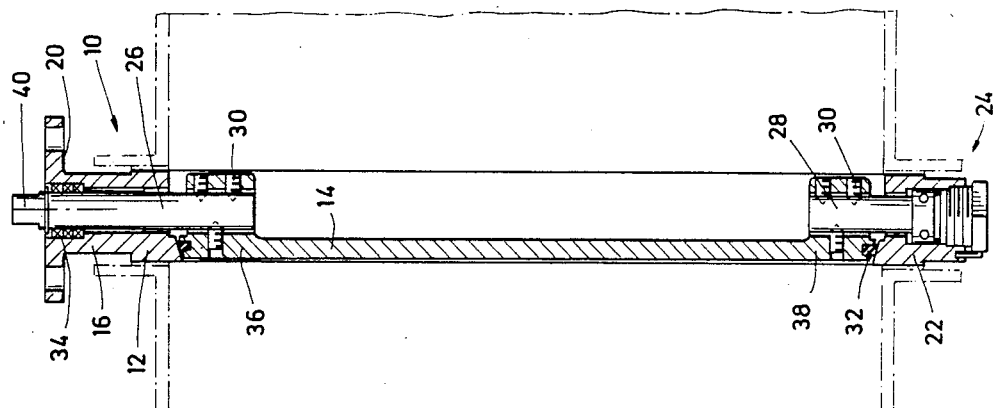

METHODS AND APPARATUS FOR ADJUSTING A VALVE CLOSURE MEMBER

BACKGROUND OF THE INVENTION

1. Field of the Invention

The present invention relates to valves of the type having a rotatable valve closure member within a valve body, and, more particularly, relates to improved techniques for adjusting the axial position of the valve closure member and an elastomeric seat carried thereon for reliable sealing engagement with the valve body.

2. Description of the Background

Various types of valves include rotatable closure members which can be manipulated to control the flow of fluid through the valve body. Many of these valves, such as butterfly valves, employ a resilient elastomeric annular seat carried on the rotatable closure member for reliable sealing engagement with the metallic valve body. It is also well known that machining costs can be reduced by providing techniques which enable the closure member, and thus the elastomeric seal, to be adjusted along the axis of the rotatable closure member, so that the closure member can be "centered" within the valve body.

Such prior art valve closure member/valve body centering devices do not, however, satisfy many of the concerns by customers of such valves. Although the techniques of the prior art may achieve the initial axial centering of the valve closure member with respect to the valve body, the prior art generally does not maintain the closure member centered if the valve is subjected to a high shock load, e.g., if the valve is dropped or jarred during shipment or installation. Also, such prior art centering devices are complicated subassemblies which require precision tolerances to maintain the proper centered relationship between the closure member and the valve body. This problem of maintaining the proper centered closure member/valve body relationship is further increased when the valve closure member is a disk, which provides only a small portion of the elastomeric seal in engagement with the valve body when the valve is in the open position.

Accordingly, many valves are manufactured and sold without such centering devices, or are installed in the field with the centering devices not achieving their intended function of properly maintaining the desired axial position between the closure member and the valve body. Accordingly, the elastomeric seal does not continue to sealingly engage the valve body, or is damaged by the forced rotation of the misaligned closure member with respect to the valve body. In either case, valve leakage results in an expensive repair and/or rebuilding operation.

U.S. Pat. No. 2,924,424 discloses a butterfly valve with the disk-shaped closure member which is axially movable with respect to the valve body during use of the valve. A nut threaded to the valve body may be used to fix the axial position in one direction of a disk with respect to the valve body, with the disk travel in the axially opposite direction toward the valve actuator being resisted by a spring.

The butterfly valve disclosed in U.S. Pat. No. 4,006,883 includes a fitting member threadably connected to the valve closure member at one end, with the opposite end of the fitting member projecting through a threaded aperture in a plate secured to the valve body. A shaft may thus be rotated for adjusting the axial position of the disk within the valve body.

A centering device shown in U.S. Pat. No. 4,036,468 includes a nut axially fixed with respect to valve body, with a threaded screw connected to the valve closure member and passing through the nut. A slide in the end of the screw allows for rotation of the screw with respect to the nut, and thus axial positioning of the closure member within the valve body.

U.S. Pat. No. 4,273,308 discloses a valve with a centering technique similar to that of the '468 patent. The nut is axially stationary with respect to the valve body, but rotates to axially move the threaded stem passing therethrough, which is connected to the closure member. The axial position of the closure member can thus be adjusted by rotating the nut.

While the prior art thus teaches various techniques for adjusting the axial position of a closure member with respect to the valve body, the art does not disclose a cost effective technique for accomplishing this purpose while simultaneously providing a mechanism which maintains the desired axial position of the closure member with respect to the valve body when the valve is subjected to a high shock load. Moreover, the prior art does not disclose reliable techniques for initially maintaining the desired axial position of the closure member with respect to the valve body during shipment and installation of the valve, and which enable the operator, if necessary, to easily adjust and then maintain this desired axial closure member/valve body position.

The disadvantages of the prior art are overcome by the present invention, and improved techniques are hereinafter disclosed for easily and reliably maintaining the desired axial position of a closure member within a valve body.

SUMMARY OF THE INVENTION

In a suitable embodiment of the present invention, an adjustable nut is provided in threaded engagement within a lower section of a butterfly valve body. A disk-shaped closure member is provided with upper and lower stems each adapted for rotatably mounting within the valve body. The shaft end of the lower stem is positioned within a recess of the nut, and is axially interconnected therewith by a pair of interference keys which prohibit axial movement of the disk in either direction with respect to the nut, while enabling the stem to freely rotate about the nut for normal valve operation.

According to the method of invention, the adjustable centering device is installed by positioning the lower stem within the recess of the nut, positioning the interference keys to axially lock the position of the stem with respect to the nut, installing the nut/lower stem subassembly within the valve body, interconnecting lower stem with the valve closure member, rotating the nut to axially move the nut with respect to the valve body and thereby axially move the lower stem and the interconnected valve closure member, and fixing the rotational position of the nut with respect to the valve body when the closure member has been properly centered within the valve body. If desired, the axial position of the valve closure member may thereafter be readjusted by further rotating the nut in either direction with respect to the valve body, then again fixing the rotational position of the nut.

It is thus an object of the present invention to provide an improved, cost-effective technique for reliably centering the axial position of a closure member within a valve body.

It is a feature of the present invention to provide an adjustable closure member centering device which includes a nut for threaded engagement with a valve body, a stem of a closure member for positioning within the recess of the nut, one or more interference members for axially fixing the position of the stem with respect to the nut while allowing the stem to rotate with respect to the nut, and a locking member for fixing the rotational position of the nut with respect to the valve body.

The present invention is particularly well suited for adjusting the axial position of a disk-shaped valve closure member within a butterfly valve body, wherein an elastomeric annular seal carried on the valve closure member can be axially centered with respect to the valve body for sealing engagement therewith, and wherein substantially the entire length of a seal is out of engagement with the valve body when the valve is in its open position.

These and further objects, features, and advantages of the present invention will become apparent from the following detailed description, wherein reference is made to the figures in the accompanying drawings.

DETAILED DESCRIPTION OF THE PREFERRED EMBODIMENTS

Figure 2:
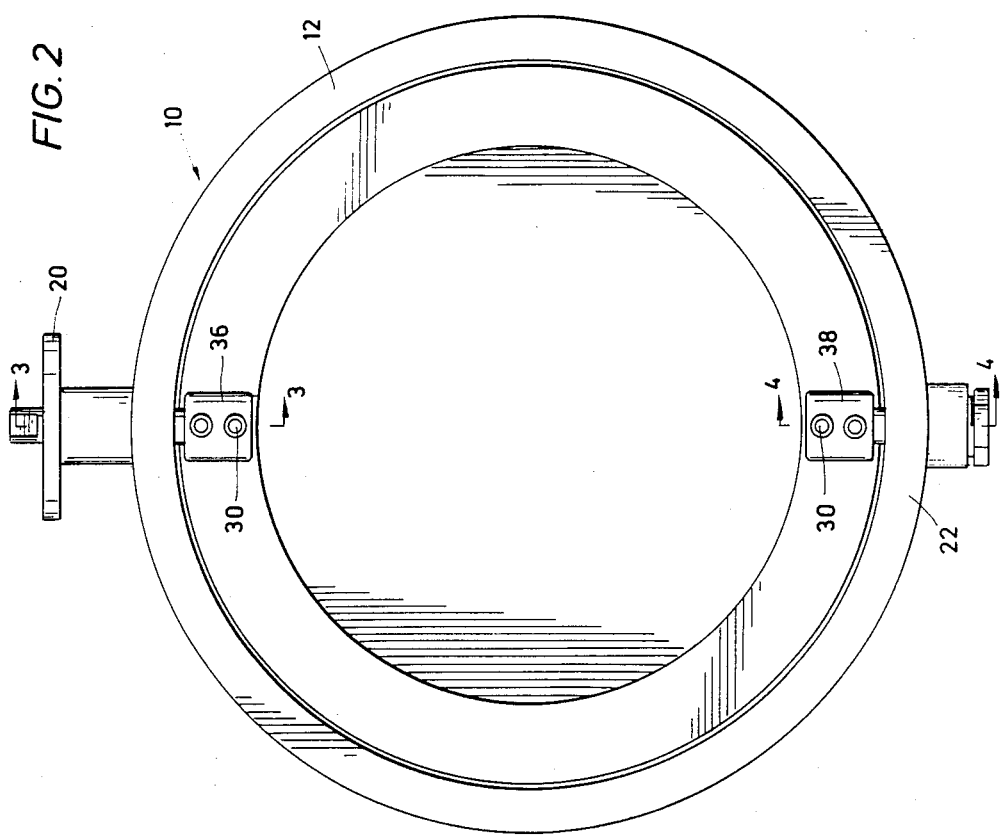
FIG. 2 is a plan view of a butterfly valve incorporating the valve closure member and adjustment mechanism of the present invention.
Figure 1:
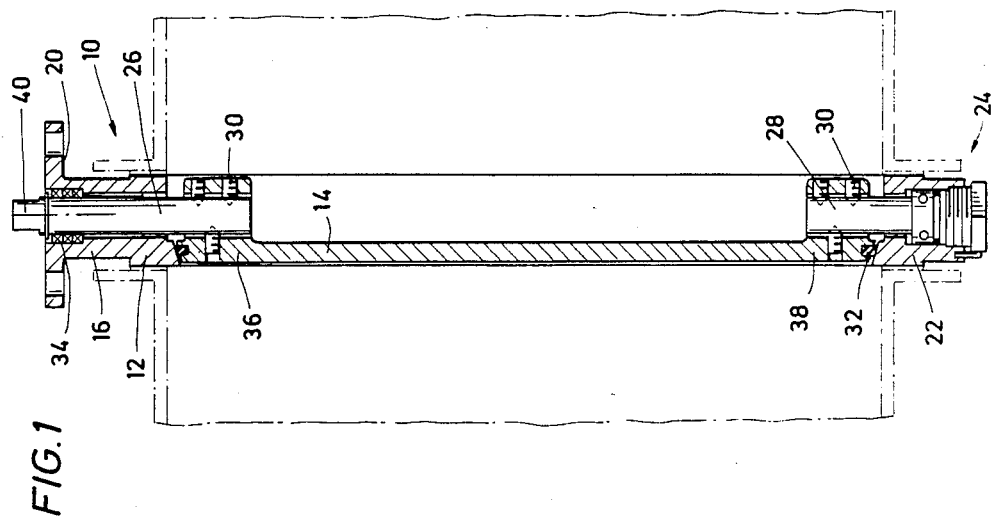
FIG. 1 is a cross-sectional view of the valve body and valve closure member shown in FIG. 2, with the valve body being positioned between axially aligned flange ends of pipes shown in dashed lines.

Referring to FIGS. 1 and 2, the present invention may be utilized for adjusting the axial position of a valve closure member within the valve body of a butterfly valve. The present invention is particularly suitable for axially positioning the plate-like closure member of the butterfly which includes an annular elastomeric sealing member about the periphery of the closure member. Those skilled in the art appreciate that the annular seal of the butterfly valve is intended for sealing engagement with the valve to prevent fluid flow when the valve is in the closed position, while most of the seal is out of engagement with the valve body when the valve is in the open position.

The valve 10 comprises a generally ring-shaped valve body 12 and a disk-shaped valve closure member 14 within the valve body. The valve body includes an upper cylindrical neck 16 and a mounting flange 20 for receiving a powered valve actuator (not shown). The lower section 22 of the valve body receives the adjustment mechanism 24 of the present invention for axially positioning the closure member 14 within the valve body.

An upper shaft 26 is interconnected with the closure member 14 by a plurality of threaded members 30, and a lower shaft 28 is similarly connected to a lower end of the disk 14. Each of the shafts 26, 28 is thus rotatably mounted within a generally cylindrical passageway through the valve body, and allows for rotation of the closure member during normal use of the valve to control fluid flow through the valve. Both shafts 26, 28 are sealed with respect to the valve body, and a conventional packing material 34 is shown for sealing engagement between the valve body and the upper shaft 26. An elastomeric annular seal 32 is provided about the periphery of the closure member 14 for sealing engagement with the valve body when the valve is in the closed position. The shaft 26 is thus rotatable about the valve body, and upper hub 36 interconnects the closure member 14 to the shaft 26.

The lower shaft 28 is similarly interconnected with the closure member by the lower hub 38. The threaded members 30 allow for adjustment of the disk 14 with respect to the valve body 12 in a direction along the flow path of the fluid through the valve. Further details with respect to this adjustment feature of the valve closure member are disclosed in U.S. Pat. No. 4,682,758, which is hereby incorporated by reference. The present invention, on the other hand, is intended to allow for adjustment of the closure member 14 with respect to the valve body 12 in either direction along the axis 40 of the closure member, i.e., along the axis of the shafts 26, 28 which rotatably mount the closure member within the valve body. In other words, the adjustment mechanism 24 allows for controlled axial movement in both directions of the closure member 14 along the axis 40 and thus the annular seal 32 with respect to the valve body, while also allowing for normal rotation of the closure member about the axis 40 to permit valve operation during normal use of the valve. Since the valve 10 is typically mounted with the actuator on top of the valve, the mechanism 24 thus allows for "up and down" movement of the closure member 14 with respect to the valve body. These terms, as well as the terms upper and lower shafts, are obviously for explanation purposes only, and should not be understood as limiting the present invention since its concepts are adaptable to a valve regardless of the orientation of the valve when installed.

Figure 3:
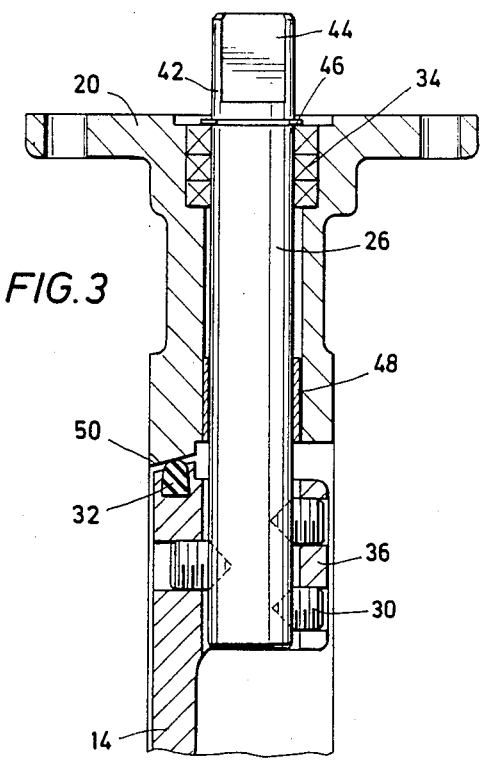
FIG. 3 is a detailed cross section taken along line 3—3 of FIG. 2.

Referring now to FIG. 3, an upper end 42 of the shaft 26 which extends through the flange 20 is provided with one or more planar surfaces 44 for facilitating rotation of the shaft 26 in a conventional fashion. A packing ring 46 is illustrated for retaining the packing material 34 in sealing engagement between the valve body and the shaft 26. A sleeve-like bushing 48 is provided axially between the packing 34 and the closure member 14, and serves to maintain the desired radial alignment between the shaft 26 within the cylindrical passageway in the valve body. The annular sealing surface 50 on the valve body is intended for engagement with the elastomeric seal 32 when the valve is in the closed position, and preferably is a frusto-conical surface. Movement with the threaded members 30 can effectively alter to a limited extent the diameter of the metal sealing surface which the elastomeric seal 32 engages.

Figure 4:
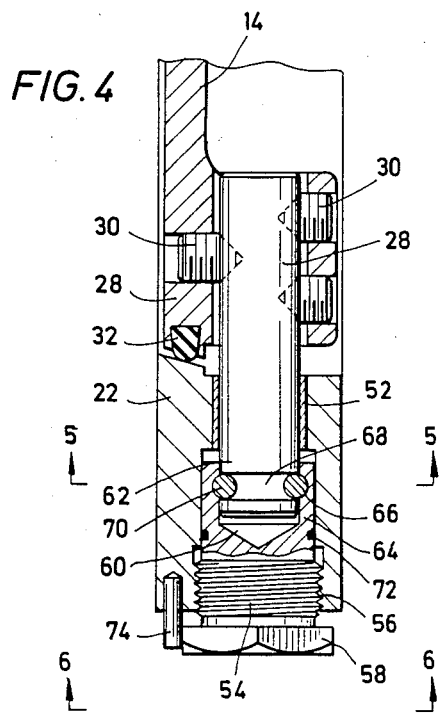
FIG. 4 is a detailed cross section taken along the line 4—4 of FIG. 2.

Referring now to FIG. 4, lower bushing 52 similar to 48 is provided between the valve body and the shaft 28. A nut 54 is provided for threaded engagement with the valve body at 56, and includes a generally hexagonal head 58. A generally cylindrical-shaped recess 60 is provided within the nut for receiving the lower end 62 of the shaft 28 therein. The sleeve-shaped body portion 64 of the nut includes a pair of generally linear passageways 66 therethrough. An annular groove 68 is provided extending radially inward of the cylindrical exterior surface of the shaft 28. The passageways 66 through the nut and the groove 68 thus cooperative to form a pair of passageways which have a generally cylindrical configuration for receiving a corresponding pair of elongate interferences keys 70 each also having a generally cylindrical configuration. Another groove is provided along the exterior of the nut for receiving an O-ring 72 for sealing engagement between the nut and the valve body. Finally, rollpin 74 is provided for prohibiting rotation of the nut 54 with respect to the valve body.

Figure 5:
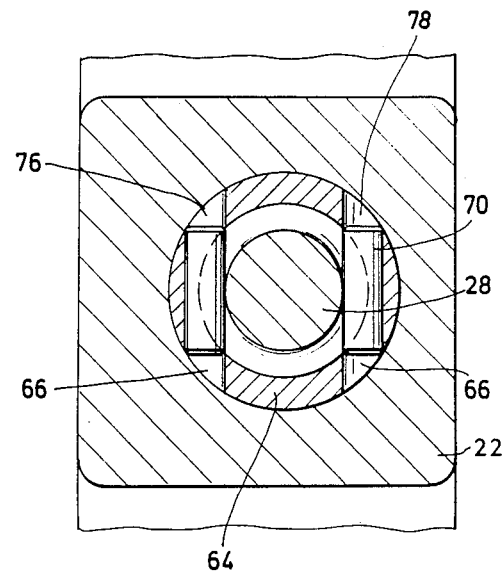
FIG. 5 is a cross-sectional view taken along the line 5—5 of FIG. 4.

FIG. 5 illustrates the configuration of cavities 76, 78 formed by the passageways 66 through the nut and the groove 68 in the shaft. It should be understood that the interlocking keys 70 prohibit axial movement of the nut 54 with respect to the shaft 28, while allowing the shaft 28 to freely rotate with respect to the nut 54. Rotation of the nut 54 with respect to the valve body will, however, cause axial movement of the shaft 28 and thus the valve closure member with respect to the valve body, since the interference members 70 axially interconnect the shaft 28 and the nut 54.

Figure 6:
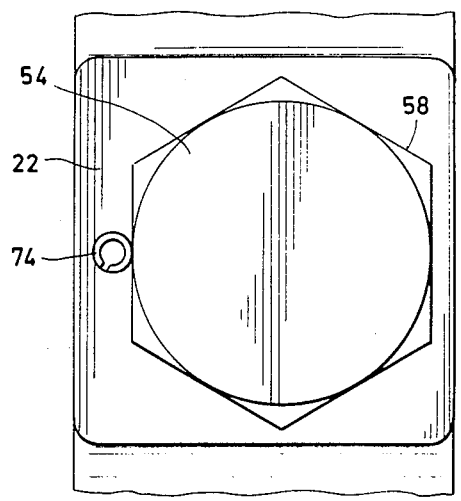
FIG. 6 is an end view of the apparatus shown in FIG. 5.

FIG. 6 depicts an end view of the nut 58 threaded on the valve body 22, and illustrates the purpose served by the rollpin 74 for prohibiting rotation of the nut with respect to the valve body. As described subsequently, the rollpin 74 may be selectively removable so that the nut 54 can be further rotated with respect to the valve body, then the rollpin 74 reinserted within the valve body for preventing inadvertent rotation of the nut.

According to the method of the present invention, the assembly of the valve 10 includes the following steps performed in sequence: (1) the lower shaft 28 is moved so that end 62 is within the cavity 60 of the nut; (2) with shaft 28 axially at its desired position with respect to the nut, the cylindrical interference members 70 may be inserted in the cavities 76, 78, thereby axially locking the position of the shaft 28 with respect to the nut; (3) with the O-ring 72 already positioned within its groove adjacent the exterior surface of the nut 54, the shaft/nut subassembly may then be connected to the valve body by threading the nut through the the valve body; (4) the valve closure member 14 and the shaft 28 may then be interconnected by threaded members 30; (5) with the upper shaft similarly connected to the valve closure member 14, the nut 54 may be rotated until the valve closure member 14 is centered within the valve body; and (6) the nut 54 may then be rotatably locked with respect to the valve body by installing rollpin 74.

If subsequent readjustment of the axial position of the closure member 14 with respect to the valve body is desired, rollpin 74 may be removed and the nut rotated in its desired direction to either raise or lower the valve closure member with respect to the valve body. The rollpin 74 may subsequently be reinserted to lock the rotational position of the nut with respect to the valve body.

From the above, those skilled in the art will appreciate that various modifications will be suggested by the above description. For example, the interference members may be in the form of a plurality of balls rather than being cylindrical-shaped. Also, the cross section of the interference member may be rectangular, with the passageways through the nut and the groove in the shaft appropriately configured to receive the rectangular-shaped interference members.

Although the present invention has been particularly described with reference to a double stem butterfly valve, it should be understood that the concepts of the present invention enable the axial adjustment of the rotatable closure member for various types of valves, such as ball valves. Also, the adjustment mechanism of the present invention is preferably located opposite the valve operable stem of the valve with respect to the body of a dual stem valve, although the adjustment mechanism could be provided adjacent the valve handle or other valve actuator for either a single stem or dual stem valve.

The foregoing disclosure and description of the invention is illustrative and explanatory thereof, and various changes in the method steps as well as in the details of the illustrated apparatus may be made within the scope of the appended claims without departing from the spirit of the invention.

What is claimed is

1. A valve of the type including a valve body having a neck portion, a valve closure member rotatable about a valve stem axis for controlling fluid flow through the valve body, an annular seal for sealing engagement between the closure member and the valve body when the valve is in the closed position, and an adjustment mechanism for selectively moving the closure member with respect to the valve body along the valve stem axis for fixing the axial position of the closure member with respect to the valve body to prevent further axial movement thereof, thereby centering the closure member with respect to the valve body, the adjustment mechanism comprising:

an adjustment valve stem means rotatable about the valve stem axis with respect to the valve body and operationally secured to the valve closure member, the valve stem means having an operator end extending through the neck portion of the valve body for rotating the valve stem means, and having an axially opposing outward end with a generally cylindrical outer surface and a groove radially inward of the outer surface;

rotatable nut means having an external thread for threaded engagement with the valve body, a head portion spaced axially opposite the operator end of the valve stem means with respect to the outward end of the valve stem means and having a cavity therein extending axially partially through the nut means with an opening axially opposite the head portion for receiving the outward end of the valve stem means;

interconnection means rotatably secured to the nut means and extending at least partially into the groove in the valve stem means for fixing the axial position of the outward end of the valve stem means within the cavity of the nut means while allowing for rotation of the valve stems means with respect to the nut means to control fluid flow through the valve body; and locking means for selectively fixing the rotational position of the nut means with respect to the valve body.

2. A valve as defined in claim 1, wherein the cavity in the nut means has a generally cylindrical-shaped configuration for receiving the opposing outward end of the adjustment valve stem means.

3. A valve as defined in claim 1, wherein the valve closure member is a disc-shaped member, and the annular seal is an elastomeric-material seal.

4. A valve as defined in claim 1, wherein the nut means has a linear passage extending through a wall surface of the nut cavity for receiving a portion of the interconnection means.

5. The valve as defined in claim 4, wherein the interconnection means comprises a generally cylindrical-shaped elongate interference key.

6. The valve as defined in claim 1, wherein the nut means has a plurality of planar surfaces extending outward from the valve body for facilitating rotation of the nut means with respect to the valve body.

7. The valve as defined in claim 1, further comprising:
a seal axially between valve closure member and the external threads on the nut means for sealing engagement between the nut means and the valve body.

8. The valve as defined in claim 1, further comprising:
threaded members carried on the valve closure member for adjusting the radial position of the valve closure member with respect to the valve stem axis.

9. A valve as defined in claim 8, wherein the valve body includes a conical-shaped metallic seating surface for sealing engagement with the annular seal when the valve is in the closed position.

10. A valve comprising:
a ring-shaped valve body having a neck portion;
a disk-shaped closure member rotatable about a valve stem axis with respect to the valve body for controlling fluid flow through the valve body;
an annular elastomeric seal for sealing engagement between the closure member and the valve body when the valve is in the closed position;
an axially adjustable valve stem rotatable with respect to the valve body about the valve stem axis and having an operator end secured to the valve closure member and extending through the neck portion for rotating the valve stem, and having an axially opposing outward end with a generally cylindrical outer surface and a groove radially inward of the outer surface;
a rotatable nut having an external thread in threaded engagement with the valve body, and having a generally cylindrical-shaped cavity therein extending partially through the nut with an opening for receiving the outward end of the valve stem;
an interconnection member rotatably secured to the nut and at least partially filling the groove in the valve stem for fixing the axial position of the outward end of the valve stem with respect to the cavity of the nut while allowing for rotation of the valve stem with respect to the nut to control fluid flow through the valve body, such that the nut may be rotated with respect to the valve body for selectively adjusting the axial position of the closure member with respect to the valve body along the valve stem axis; and
a locking member for selectively fixing the rotational position of the nut with respect to the valve body.

11. A valve as defined in claim 10, wherein the nut has a linear passage through a wall surface of the nut cavity for receiving a portion of the interconnection member.

12. A valve as defined in claim 11, wherein the interconnection member includes one or more generally cylindrical-shaped interference keys.

13. A method of adjusting the axial position of a valve closure member with respect to a valve body, the valve closure member being rotatable about a valve stem axis with respect to the valve body having a neck portion for controlling fluid flow through the valve body, and an annular seal for sealing engagement between the closure member and the valve body when the valve is in the closed position, a method comprising:
forming a valve stem rotatable about the valve stem axis and securable to the valve closure member and having an upper first end extending through the neck portion of the valve body and an opposing second lower end, the lower second end having a generally cylindrical outer surface and a groove radially inward of the outer surface;
providing a nut having an external thread for threaded engagement with the valve body and having a cylindrical-shaped cavity therein extending axially partially through the nut;
positioning the opposing second end of the valve stem within the cavity of the nut;
thereafter rotatably interconnecting one or more interference members to the nut and extending into the groove of the valve stem to fix the axial position of the valve stem with respect to the nut while allowing for rotation of the valve stem with respect to the nut to control fluid flow through the valve body;
thereafter threading the nut to the valve body while the valve stem is axially fixed to the nut;
thereafter securing the valve stem to the valve closure member;
thereafter rotating the nut to adjust the axial position of the valve closure member with respect to the valve body; and
thereafter locking the rotational position of the nut with respect to the valve body to prevent inadvertent rotation of the nut.

14. A method as defined in claim 13, further comprising:
providing a seal axially between the closure member and the threads on the nut for sealing engagement between the nut and the valve body.

15. A method as defined in claim 13, further:
providing adjustment members for adjusting the radial position of the closure member with respect to the axis of the valve stem; and
selectively adjusting the adjustment members for altering the radial position of the closure member with respect to the valve stem axis.

16. A method as defined in claim 15, further comprising:
forming a conical-shaped seating surface on the valve body for sealing engagement with the annular seal when the valve is in the closed position.

* * * * *